(12) United States Patent
Jiang

(10) Patent No.: US 11,736,857 B2
(45) Date of Patent: Aug. 22, 2023

(54) CLOSED LOUDSPEAKER BOX, DISPLAY DEVICE AND METHOD FOR TESTING CLOSED LOUDSPEAKER BOX

(71) Applicants: K-tronics (Su Zhou) Technology Co., Ltd., Suzhou (CN); BOE TECHNOLOGY GROUP CO., LTD., Beijing (CN)

(72) Inventor: Jiahong Jiang, Beijing (CN)

(73) Assignees: K-TRONICS (SU ZHOU) TECHNOLOGY CO., LTD., Suzhou (CN); BOE TECHNOLOGY GROUP CO., LTD., Beijing (CN)

( * ) Notice: Subject to any disclaimer, the term of this patent is extended or adjusted under 35 U.S.C. 154(b) by 179 days.

(21) Appl. No.: 17/298,111

(22) PCT Filed: Sep. 11, 2020

(86) PCT No.: PCT/CN2020/114768
§ 371 (c)(1),
(2) Date: May 28, 2021

(87) PCT Pub. No.: WO2021/047636
PCT Pub. Date: Mar. 18, 2021

(65) Prior Publication Data
US 2022/0030352 A1    Jan. 27, 2022

(30) Foreign Application Priority Data
Sep. 12, 2019   (CN) .......................... 201910870063.5

(51) Int. Cl.
*H04R 1/02*    (2006.01)
*H04R 29/00*    (2006.01)
(Continued)

(52) U.S. Cl.
CPC .......... *H04R 1/2826* (2013.01); *G01M 3/329* (2013.01); *H04R 1/028* (2013.01); *H04R 29/001* (2013.01); *H04R 2499/15* (2013.01)

(58) Field of Classification Search
CPC . H04R 1/00; H04R 1/02; H04R 1/028; H04R 1/2826; H04R 1/2811;
(Continued)

(56) References Cited

U.S. PATENT DOCUMENTS 8,767,995 B2 *   7/2014   Hwang ................ H04R 1/2888
                                                                          381/373
2012/0219173 A1   8/2012   Yukawa

FOREIGN PATENT DOCUMENTS

CN    204721540 U   * 10/2015 ............... H04R 1/10
CN    206585704 U     10/2017
(Continued)

*Primary Examiner* — Thang V Tran
(74) *Attorney, Agent, or Firm* — Westman, Champlin & Koehler, P.A.

(57) ABSTRACT

Disclosed are a closed loudspeaker box, a display device including the closed loudspeaker box, and a method for testing the closed loudspeaker box. The closed loudspeaker box includes: a housing; a chamber surrounded by the housing; a through hole penetrating the housing and communicating with the chamber; and a plug, at least a part of the plug is inserted into the through hole, wherein the plug includes a plug main body and a vent hole penetrating the plug main body, and the vent hole communicates the chamber and a space outside the housing.

17 Claims, 12 Drawing Sheets

(51) Int. Cl.
*H04R 1/28* (2006.01)
*G01M 3/32* (2006.01)

(58) Field of Classification Search
CPC .. H04R 1/2823; H04R 1/2846; H04R 1/2849;
H04R 1/345; H04R 29/00; H04R 29/001;
H04R 9/02; H04R 9/06; H04R 2499/15;
G01M 3/329
See application file for complete search history.

(56) References Cited

FOREIGN PATENT DOCUMENTS

| | | |
|---|---|---|
| CN | 207427465 U | 5/2018 |
| CN | 207835764 U | 9/2018 |
| CN | 208227221 U | 12/2018 |
| CN | 210225661 U | 3/2020 |
| EP | 1696694 A1 * | 8/2006 ........... H04R 1/2803 |

* cited by examiner

CLOSED LOUDSPEAKER BOX, DISPLAY DEVICE AND METHOD FOR TESTING CLOSED LOUDSPEAKER BOX

CROSS-REFERENCE TO RELATED APPLICATION(S)

This application is a 371 National Stage application of International Application No. PCT/CN2020/114768, filed on 11 Sep. 2020, which published as WO 2021/047636 A1, on 18 Mar. 2021, which claims priority to Chinese Application No. 201910870063.5, filed on Sep. 12, 2019, the contents of which are incorporated herein by reference in their entireties.

TECHNICAL FIELD

The present disclosure relates to a field of loudspeaker box, and in particular to a closed loudspeaker box, a display device including the closed loudspeaker box, and a method for testing the closed loudspeaker box.

BACKGROUND

A loudspeaker box is a terminal of an entire sound system, the loudspeaker box is a device that switches audio electric energy into corresponding sound energy and radiates it into the space. The loudspeaker box generally includes main components such as a loudspeaker, a housing, and a divider. Among them, the housing may be used to eliminate acoustic short circuits of the loudspeaker, suppress acoustic resonances of the loudspeaker and widen frequency response ranges of the loudspeaker, thereby reducing distortions of the sound.

According to the classification of an internal structure of the housing, the loudspeaker box may include various forms such as closed, inverted and band-pass, etc. Among them, the loudspeaker of a closed loudspeaker box is installed in a completely closed housing. In this way, a reversed sound wave radiated backwards by a diaphragm of the loudspeaker is completely blocked by the housing, and will not go outside the housing and cancel a positive sound wave in front of the diaphragm, thereby solving the problem of "acoustic short circuits".

SUMMARY

In one aspect, a closed loudspeaker box is provided, including:
a housing;
a chamber, the chamber is surrounded by the housing;
a through hole, the through hole penetrates the housing and communicates with the chamber; and
a plug, wherein at least a part of the plug is inserted into the through hole,
wherein the plug includes a plug main body and a vent hole penetrating the plug main body, and the vent hole communicates the chamber and a space outside the housing.

For example, the plug includes a central axis extending along a length direction of the plug main body, and a size of the vent hole in a direction perpendicular to the central axis is smaller than a size of the through hole in the direction perpendicular to the central axis.

For example, the size of the vent hole in the direction perpendicular to the central axis is less than or equal to $\frac{1}{10}$ of the size of the through hole in the direction perpendicular to the central axis.

For example, the size of the vent hole in the direction perpendicular to the central axis is related to a volume of the chamber.

For example, a size of the vent hole in the direction along the central axis is related to a size of the vent hole in the direction perpendicular to the central axis.

For example, the plug main body includes a head, a neck, and a tail, the neck is located between the head and the tail in a direction along the central axis, and a size of the neck in the direction perpendicular to the central axis is smaller than a size of the head in the direction perpendicular to the central axis.

For example, the vent hole penetrates the head, the neck and the tail in the direction along the central axis.

For example, the tail includes a tapered portion and a cylindrical portion, the tapered portion is closer to the neck than the cylindrical portion, and a size of the tapered portion in the direction perpendicular to the central axis gradually decreases from the neck toward the cylindrical portion.

For example, a portion of the tapered portion close to the neck has a first size in the direction perpendicular to the central axis, and the size of the neck in the direction perpendicular to the central axis is smaller than the first size of the tapered portion.

For example, the through hole includes a first through hole and a second through hole, and a size of the first through hole in the direction perpendicular to the central axis is larger than a size of the second through hole in the direction perpendicular to the central axis.

For example, a hole wall of the first through hole is in contact with an outer surface of the head, and a hole wall of the second through hole is in contact with an outer surface of the neck.

For example, the head of the plug includes a first stepped surface facing the neck, the housing includes a protruding portion, the protruding portion includes a first surface facing the head, and the first stepped surface is in contact with the first surface.

For example, the tapered portion of the plug includes a second stepped surface facing the neck, the protruding portion includes a second surface facing the tail, and the second stepped surface is in contact with the second surface.

For example, the plug main body is composed of an elastic material.

For example, the tail is located in the chamber.

For example, a size of the neck in a direction along the central axis is equal to a size of the second through hole in the direction along the central axis, and a size of the head in the direction along the central axis is equal to a size of the first through hole in the direction along the central axis.

An orthographic projection of any one of the through hole, the plug main body, and the vent hole in the direction perpendicular to the central axis is circular.

For example, the closed loudspeaker box includes only one plug.

In another aspect, a display device is provided, including the above-mentioned closed loudspeaker box.

In still another aspect, there is provided a method for testing the above-mentioned closed loudspeaker box, including:
inflating the chamber through the through hole before the plug is inserted into the through hole;
performing an air tightness test on the closed loudspeaker box; and inserting at least a part of the plug into the through hole after the air tightness test is completed.

BRIEF DESCRIPTION OF THE DRAWINGS

Through the following description of the present disclosure with reference to the accompanying drawings, other purposes and advantages of the present disclosure will be apparent and may help a comprehensive understanding of the present disclosure.

Figure 1:
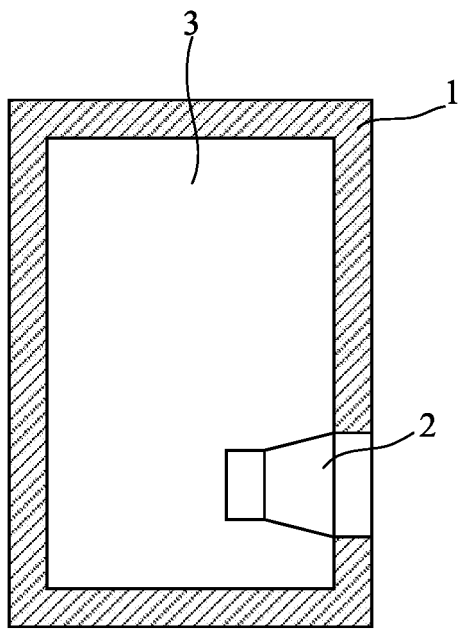
FIG. 1 is a schematic cross-sectional view of a closed loudspeaker box in the related art.

It should be noted that, for clarity, in the accompanying drawings used to describe the embodiments of the present disclosure, sizes of layers, structures or regions may be enlarged or reduced, that is, these accompanying drawings are not drawn according to actual scale.

DETAILED DESCRIPTION OF EMBODIMENTS

In order to make purposes, technical solutions, and advantages of the embodiments of the present disclosure clearer, technical solutions of the embodiments of the present disclosure will be described clearly and completely in conjunction with the accompanying drawings of the embodiments of the present disclosure. Obviously, the described embodiments are part of the embodiments of the present disclosure, rather than all of the embodiments. Based on the described embodiments of the present disclosure, all other embodiments obtained by those skilled in the art without creative labor are within the protection scope of the present disclosure.

Unless otherwise defined, technical terms or scientific terms used in the present disclosure shall have general meanings understood by those skilled in the art. "First", "second" and similar words used in the present disclosure do not indicate any order, quantity or importance, but are only used to distinguish different components. "Include" or "comprise" and other similar words mean that elements or items appearing before the word cover the elements or items listed after the word and their equivalents, but do not exclude other elements or items.

In the present disclosure, unless specifically stated otherwise, directional terms such as "upper", "lower", "left", "right", "inner", "outer", "front", "rear" and other directional terms are used to indicate an orientation or positional relationship based on the accompanying drawings is only for the convenience of describing the present disclosure, and does not indicate or imply that a device, element, or component referred to must have a specific orientation, and be configured or operated in a specific orientation. It should be understood that, when an absolute position of a described object changes, a relative position relationship represented by those terms may also change accordingly. Therefore, these directional terms should not be construed as limiting the present disclosure.

In the present disclosure, the expression "central axis" refers to an axis of an object or a hole extending along its length direction. Generally, the object or the hole extends along its central axis. It should be understood that the central axis is an imaginary line used to indicate an extending direction of the object or the hole, and does not mean that the object or the hole has a physical central axis; moreover, the central axis of an object or a hole is not necessarily a straight line, it may be a straight line, a curve or a polyline.

Further, in the present disclosure, expressions "size in the direction perpendicular to the central axis" and "size in the direction along the central axis" are used to indicate the sizes of the object or the hole in two directions. For example, for a through hole or a vent hole with a circular cross-section, "size in the direction perpendicular to the central axis" refers to a diameter of the through hole or the vent hole, and "size in the direction along the central axis" refers to a length of the through hole or the vent hole.

The embodiments of the present disclosure provide a closed loudspeaker box, a display device including the closed loudspeaker box, and a method for testing the closed loudspeaker box.

FIG. 1 is a schematic cross-sectional view of a closed loudspeaker box in the related art. As shown in FIG. 1, a closed loudspeaker box generally includes main components such as a housing 1 and a loudspeaker 2, etc. The housing 1 surrounds and forms a chamber 3, and the loudspeaker 2 is installed in the housing 1 to form a closed chamber 3. In this way, a reverse sound wave radiated backwards by a diaphragm of the loudspeaker is completely blocked by the housing, and will not go outside the housing and cancel a positive sound wave in front of the diaphragm and solves the problem of "acoustic short circuits". However, in this closed loudspeaker box, a space inside the housing 1 (i.e, the chamber 3) is completely isolated from the space outside the housing 1, in this way, when the closed loudspeaker box is used in different environments (such as low-pressure environment, high-pressure environment), an air pressure in the space inside the housing 1 (i.e, the chamber 3) is not consistent with the air pressure in the space outside the housing 1, that is, the air pressure inside and outside the housing may not be balanced, which affects acoustic characteristics of the closed loudspeaker box, and even affects a service life of the closed loudspeaker box. Moreover, when the closed loudspeaker box is operating, some heat will accumulate inside the housing. Since the space inside the housing 1 (i.e, the chamber 3) is completely isolated from the space outside the housing 1, the heat accumulated may not be discharged, which further affects the acoustic characteristics of the closed loudspeaker box, and even affects the service life of the closed loudspeaker box. In addition, since the closed loudspeaker box has no holes for inflation, an air tightness test may not be performed after the enclosed loudspeaker box is manufactured, which is not conducive to ensuring a stability of product quality.

Figure 2:
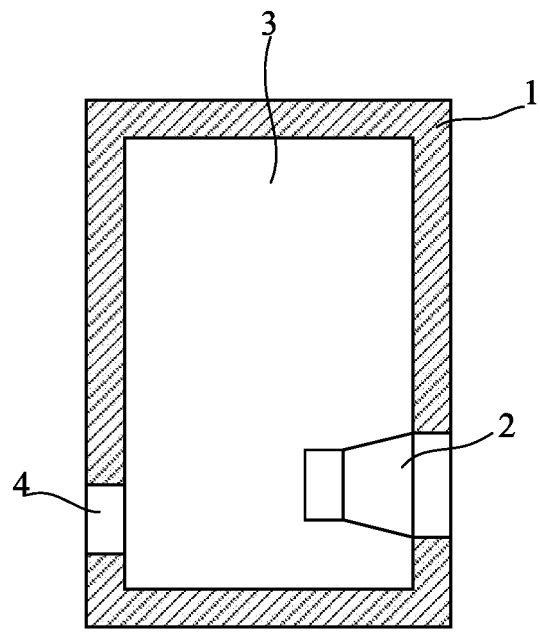
FIG. 2 is a schematic cross-sectional view of another closed loudspeaker box in the related art.

In order to overcome the above-mentioned shortcomings, a closed loudspeaker box with vent holes is proposed in the related art. FIG. 2 is a schematic cross-sectional view of another enclosed loudspeaker box in the related art. As shown in FIG. 2, the closed loudspeaker box includes main components such as the housing 1 and the loudspeaker 2, etc. The housing 1 surrounds and forms a chamber 3, and the loudspeaker 2 is installed in the housing 1. A vent hole 4 is provided on a casing of the housing 1. In order to reduce manufacturing difficulties and shorten an inflation time during an air tightness test, an aperture of the vent hole 4 is generally designed to be relatively large. However, for a closed loudspeaker box with a large-aperture vent hole 4, when it is operating, a large airflow sound may be generated at the large-aperture vent hole 4 and may cause abnormal sound, thereby affecting the acoustic characteristics of the closed loudspeaker box.

Figure 3:
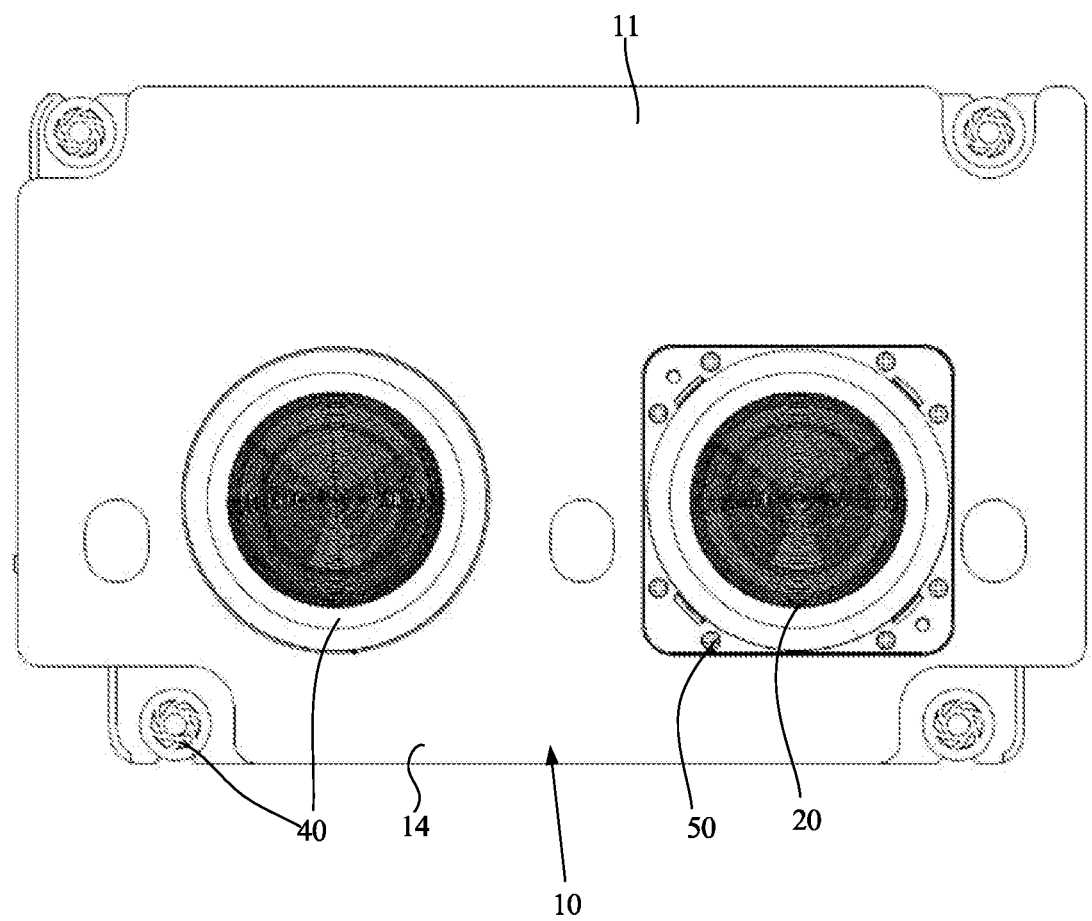
FIG. 3 is a front view of a closed loudspeaker box according to the embodiments of the present disclosure.
Figure 4:
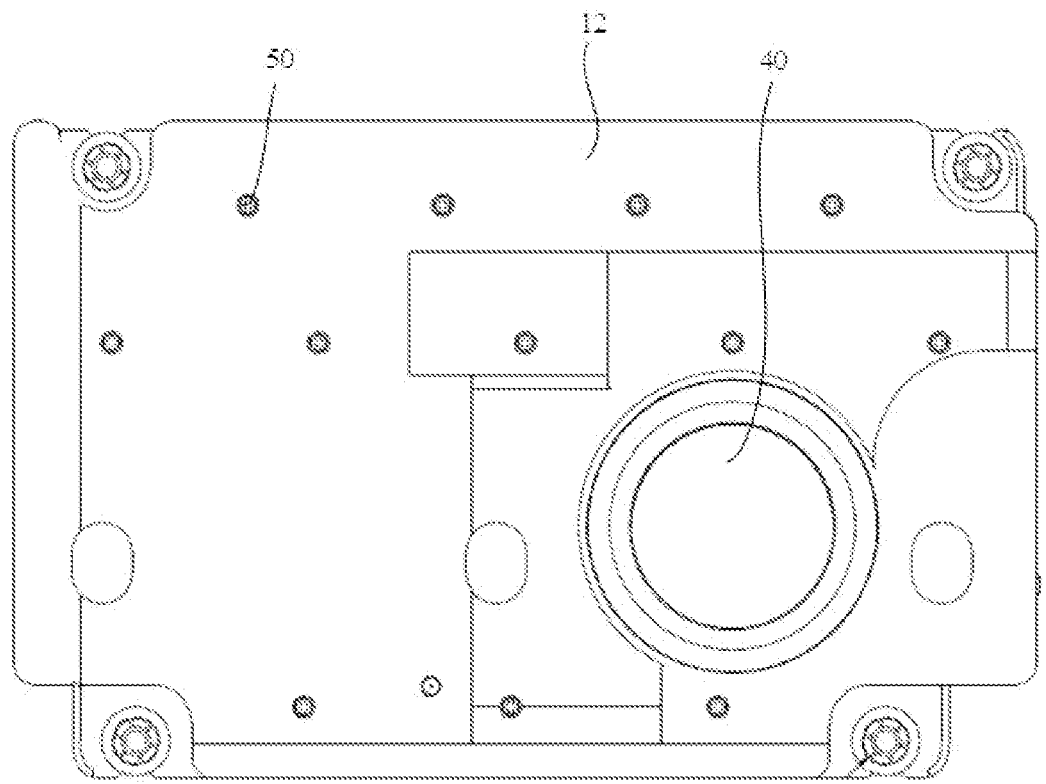
FIG. 4 is a rear view of the closed loudspeaker box according to the embodiments of the present disclosure.
Figure 5:
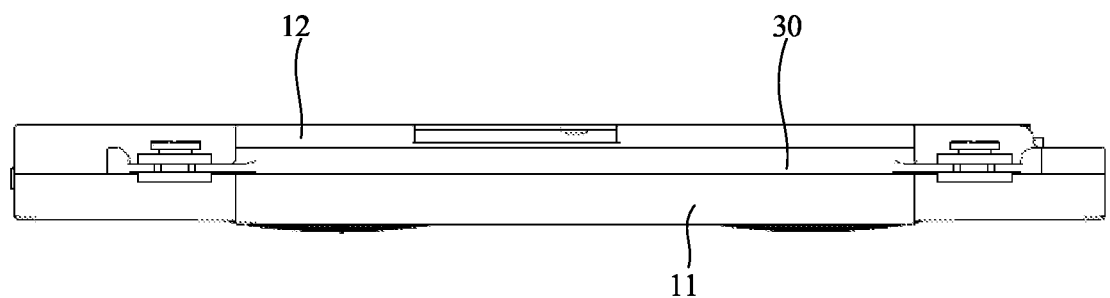
FIG. 5 is a top view of the closed loudspeaker box according to the embodiments of the present disclosure.
Figure 6:
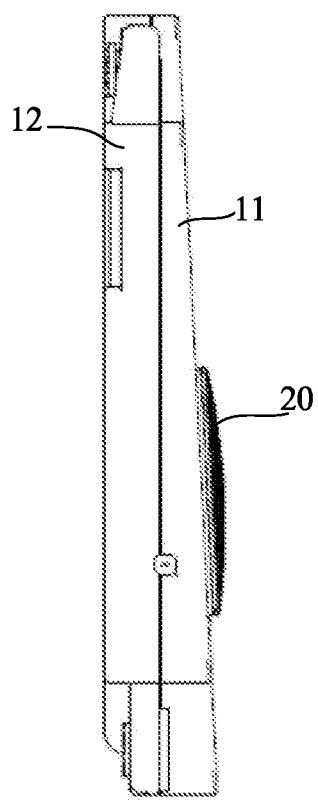
FIG. 6 is a side view of the closed loudspeaker box according to the embodiments of the present disclosure.

In order to solve the above-mentioned contradiction, the embodiments of the present disclosure propose a closed loudspeaker box. FIG. 3 is a front view of the closed loudspeaker box according to the embodiments of the present disclosure, FIG. 4 is a rear view of the closed loudspeaker box according to the embodiments of the present disclosure, FIG. 5 is a top view of the closed loudspeaker box according to the embodiments of the present disclosure, and FIG. 6 is a side view of the closed loudspeaker box according to the embodiments of the present disclosure. With reference to FIGS. 3 to 6 in combination, the closed loudspeaker box includes: a housing 10, a loudspeaker 20, a chamber 30 and a radiator 40. The housing 10 defines the chamber 30. Specifically, the housing 10 includes a front casing 11 and a rear casing 12, and the front casing 11 and the rear casing 12 are assembled together to form the chamber 30. A part of the front casing 11 constitutes a sound output panel 14 of the closed loudspeaker box. A part of the loudspeaker 20 is arranged in the chamber 30 and the other part of the loudspeaker 20 is arranged on the sound output panel 14.

It should be understood that the loudspeaker is a device that converts electrical signals into acoustic signals, and it mainly includes components such as a coil, a magnet, and a paper cone, etc. Current (alternating current) signals of varying sizes output from an amplifier pass through the coil and move the coil under an action of a magnetic field. The coil is connected to the paper cone to drive the paper cone to vibrate, and then a vibration of the paper cone pushes the air to produce sound. For example, the loudspeaker 20 may be a woofer speaker, and a specific structure of the loudspeaker 20 may refer to the specific structure of the loudspeaker in the related art, which will not be repeated here.

The radiator 40 may be a passive radiator. For example, the passive radiator may include the paper cone but does not include the coil and the magnet. In the embodiments of the present disclosure, the loudspeaker 20 serves as an active unit, and the radiator 40 serves as a passive unit. The radiator 40 passively emits sound under a driving of the active unit 20 to the air in the chamber 30. A specific structure of the radiator 40 may refer to the specific structure of the passive radiator in the related art, which will not be repeated here.

Optionally, the closed loudspeaker box may include one speaker 20 and a plurality of radiators 40. For example, one radiator 40 may be arranged on the sound output panel 14, one radiator 40 may be arranged on the rear casing 12, and four radiators 40 may be arranged on four corners of the front casing 11, respectively. The number and positions of the radiators shown in the drawings are only exemplary, and the embodiments of the present disclosure do not specifically limit the number and positions of the radiators.

Both the loudspeaker 20 and the radiators 40 are fixed on the front casing 11 and/or the rear casing 12 of the housing 10 by a fixing element 50. For example, the fixing element may be a screw.

Figure 7:
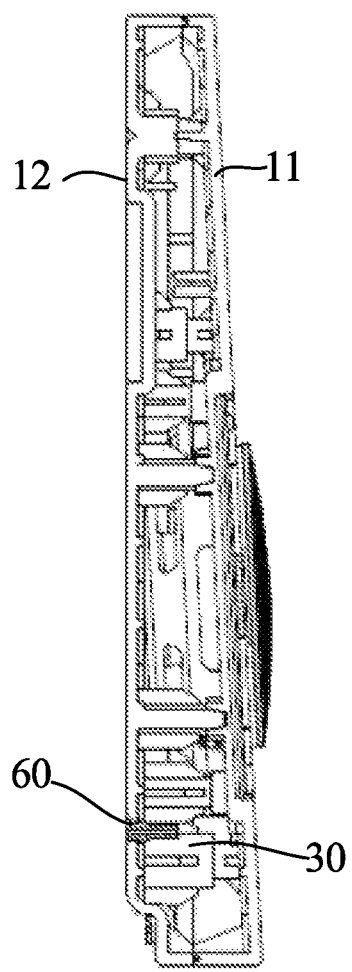
FIG. 7 is a cross-sectional view of the closed loudspeaker box according to the embodiments of the present disclosure.

FIG. 7 is a cross-sectional view of the closed loudspeaker box according to the embodiments of the present disclosure. As shown in FIG. 7, the closed loudspeaker box further includes a plug 60. With reference to FIG. 4, FIG. 6 and FIG. 7 in conjunction, the closed loudspeaker box includes a plug 60, and the plug 60 is arranged at a position of the rear casing 12 close to a lower side. However, the embodiments of the present disclosure do not intend to specifically limit a location of the plug. In other embodiments, the plug 60 may be arranged at any other suitable location.

Figure 8:
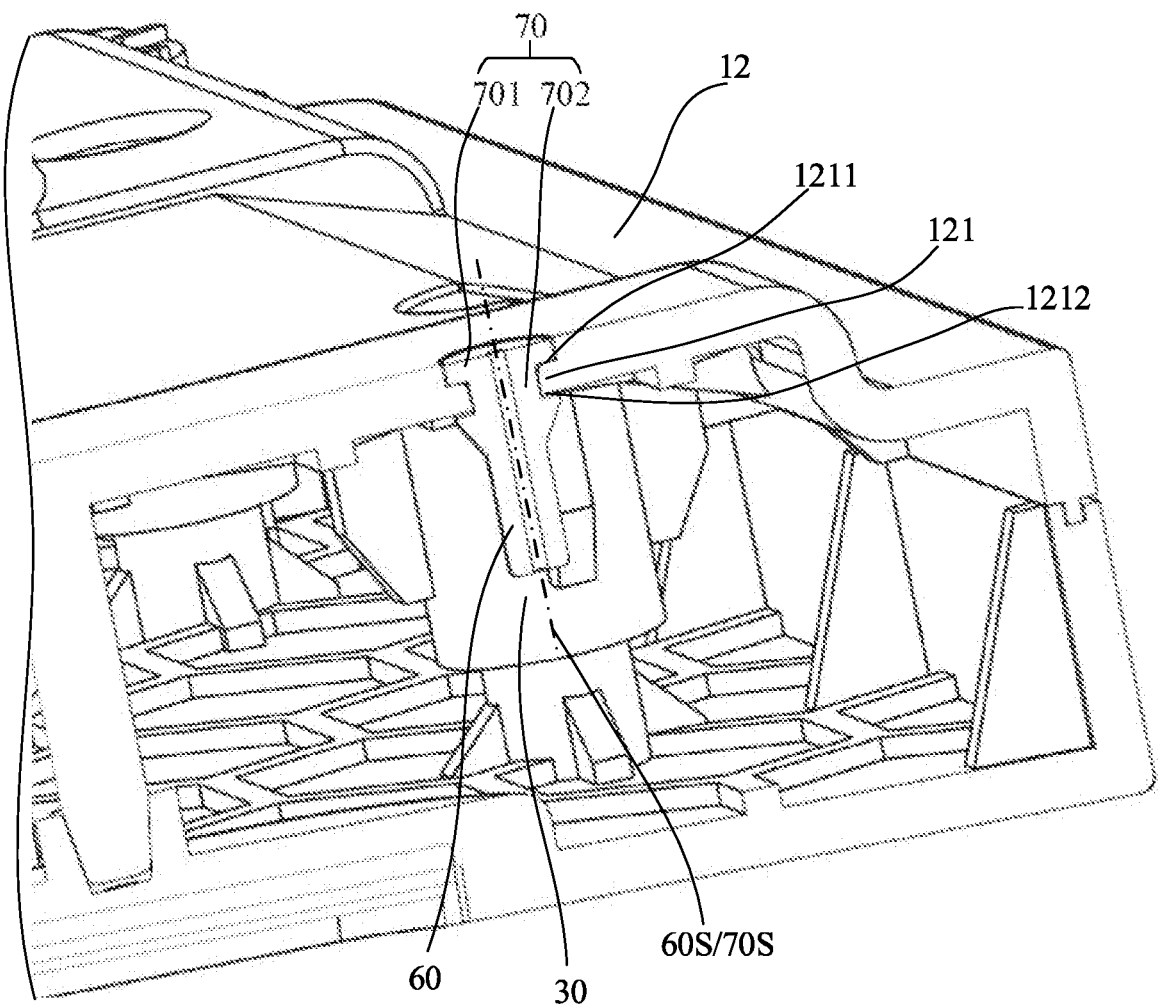
FIG. 8 shows a partial enlarged view of the closed loudspeaker box according to the embodiments of the present disclosure, which schematically shows a plug in an assembled state.
Figure 9:
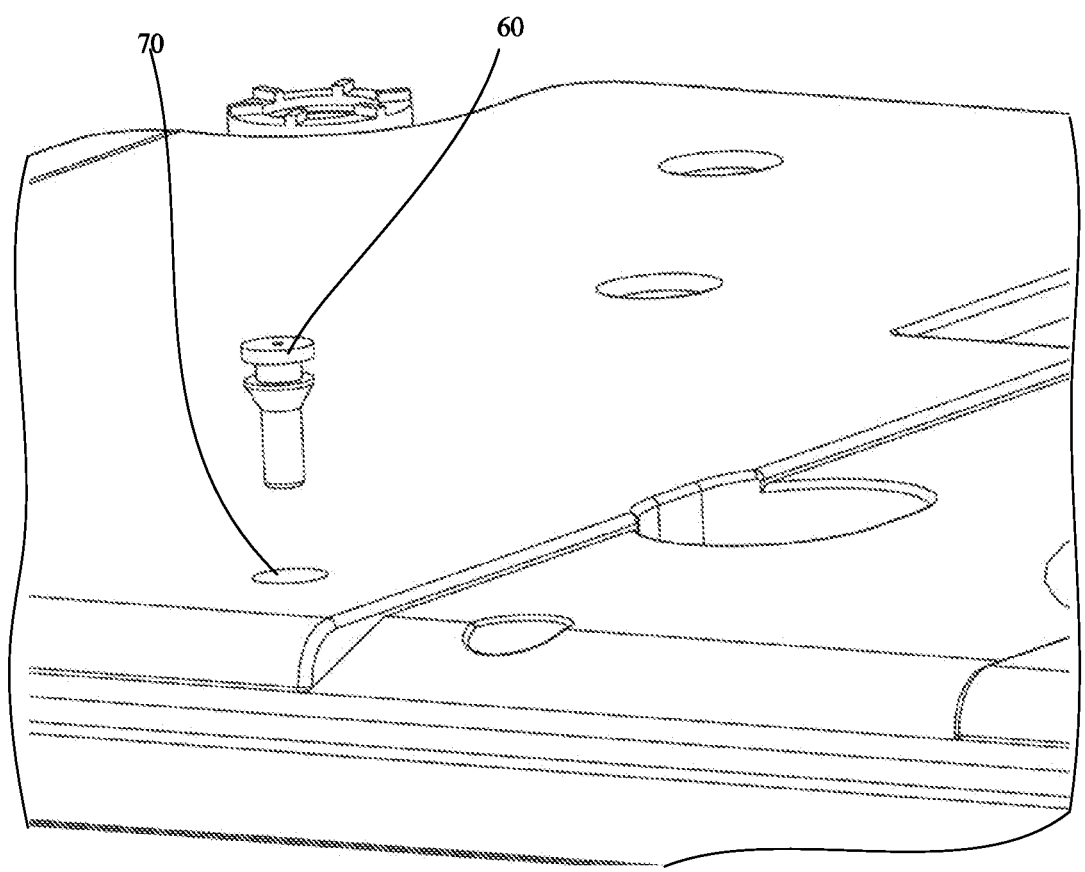
FIG. 9 shows a partial enlarged view of the closed loudspeaker box according to the embodiments of the present disclosure, which schematically shows the plug in a separated state.

FIG. 8 shows a partial enlarged view of the closed loudspeaker box according to the embodiments of the present disclosure, and it schematically shows the plug in an assembled state. FIG. 9 shows a partial enlarged view of the closed loudspeaker box according to the embodiments of the present disclosure, and it schematically shows the plug in a separated state. With reference to FIGS. 8 and 9 in conjunction, the closed loudspeaker box includes a through hole 70 provided on the housing 10, and the through hole 70 may penetrate the housing 10. For example, the through hole 70 may be provided on the rear casing 12 of the housing 10 and penetrate the rear casing 12. The through hole 70 communicates the chamber 30 and a space outside the housing 10. The plug 60 is inserted into the through hole 70.

Figure 10A:
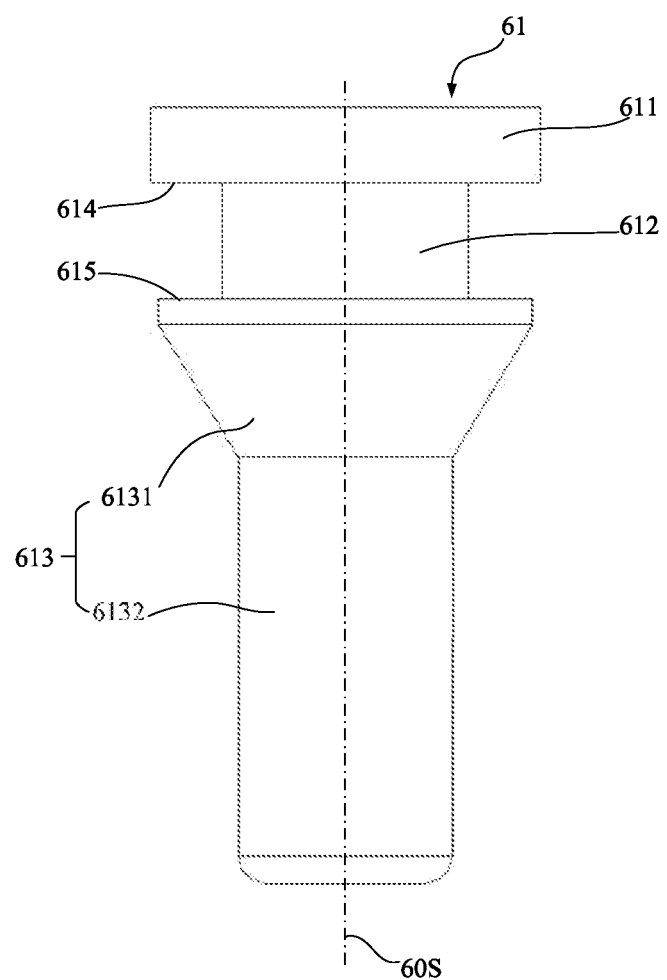
FIG. 10A is a front view of the plug included in the closed loudspeaker box according to the embodiments of the present disclosure.
Figure 10B:
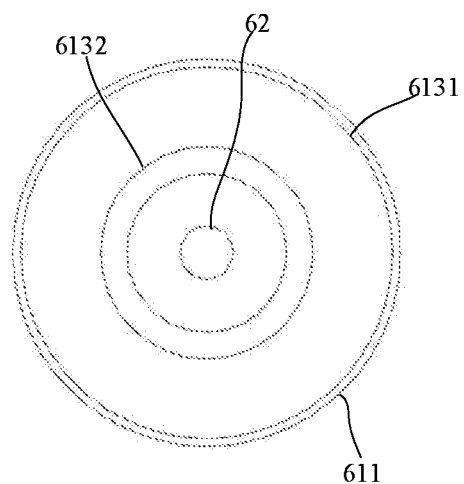
FIG. 10B is a top view of the plug included in the closed loudspeaker box according to the embodiments of the present disclosure.
Figure 10C:
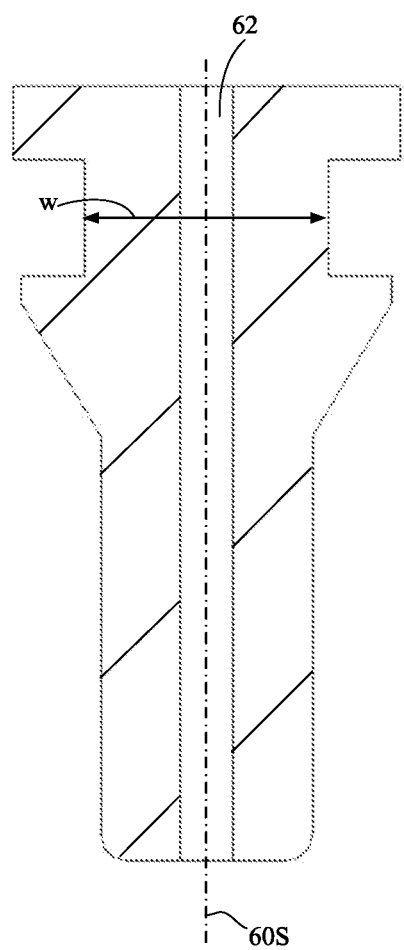
FIG. 10C is a cross-sectional view of the plug included in the closed loudspeaker box according to the embodiments of the present disclosure.

FIG. 10A is a front view of the plug included in the closed loudspeaker box according to the embodiments of the present disclosure, FIG. 10B is a top view of the plug included in the closed loudspeaker box according to the embodiments of the present disclosure, and FIG. 10C is a cross-sectional view of the plug included in the closed loudspeaker box according to the embodiments of the present disclosure. With reference to FIGS. 8, 9 and 10A-10C in conjunction, the plug 60 includes a plug main body 61 and a vent hole 62 penetrating the plug main body 61. When the plug 60 is inserted into the through hole 70, the vent hole 62 communicates the chamber 30 and the space outside the housing 10.

The plug main body 61 includes a head 611, a neck 612 and a tail 613. The neck 612 is located between the head 611 and the tail 613. The tail 613 may include a tapered portion 6131 and a cylindrical portion 6132.

For example, the plug 60 may include a central axis 60S extending along its length direction. It should be understood that the central axis 60S is an imaginary straight line and does not mean that the plug 60 has a physical central axis. The vent hole 62 and the plug main body 61 both extend along the central axis 60S. In an example, orthographic projections of the vent hole 62 and the plug main body 61 in a direction perpendicular to the central axis 60S are both circular, as shown in FIG. 10B. Optionally, a center of the orthographic projection of the vent hole 62 in the direction perpendicular to the central axis 60S (for example, the center of circle 62 in FIG. 10B) and a center of the orthographic projection of the plug body 61 in the direction perpendicular to the central axis 60S (for example, the center of circle 611 in FIG. 10B) coincide.

The head 611, the neck 612, the tapered portion 6131, and the cylindrical portion 6132 are sequentially arranged in a direction parallel to the central axis 60S. A size of the tapered portion 6131 in the direction perpendicular to the central axis 60S gradually decreases from the neck 612 toward the cylindrical portion 6132. For example, a portion of the tapered portion 6131 close to the neck 612 has a first size, and a portion of the tapered portion 6131 close to the cylindrical portion 6132 has a second size, and the first size is larger than the second size.

A size of the neck 612 in the direction perpendicular to the central axis 60S (for example, the size w in FIG. 10C) is smaller than a size of the head 611 in the direction perpendicular to the central axis 60S (for example, a diameter of the circle 611 in FIG. 10B), and is also smaller than the first size of the tapered portion 6131 in the direction perpendicular to the central axis 60S (for example, the diameter of a circle 6131 in FIG. 10B). In this way, a first stepped surface is formed between the head 611 and the neck 612, that is, the surface 614 of the head 611 facing the neck 612; a second stepped surface is formed between the neck 612 and the tapered portion 6131, that is, the surface 615 of the tapered portion 6131 facing the neck 612. It should be understood that both the first stepped surface 614 and the second stepped surface 615 are farther away from the central axis 60S than the neck 612.

Correspondingly, as shown in FIG. 8, the through hole 70 is in a form of a stepped hole. The through hole 70 may include a central axis 70S extending along its length direction. It should be understood that the central axis 70S is an imaginary straight line and does not mean that the through hole 70 has a physical central axis. When the plug 60 is inserted into the through hole 70, the central axis 60S coincides with the central axis 70S. In one example, an orthographic projection of the through hole 70 in a direction perpendicular to the central axis 70S is circular. The through hole 70 includes a first through hole 701 and a second through hole 702. A size (for example, diameter) of the first through hole 701 in the direction perpendicular to the central axis 70S is larger than a size (for example, diameter) of the second through hole 702 in the direction perpendicular to the central axis 70S. When the plug 60 is inserted into the through hole 70, the head 611 is matched with the first through hole 701, that is, an outer surface of the head 611 is in contact with a hole wall of the first through hole 701; the neck 612 is matched with the second through hole 702, that is, an outer surface of the neck 612 is in contact with a hole wall of the second through hole 702.

In this embodiment, the through hole 70 is provided on the rear casing 12 of the housing 10, and the through hole 70 will form a stepped structure on the rear casing 12 accordingly. As shown in FIG. 8, the hole wall of the second through hole 702 is closer to the central axis 70S than the hole wall of the first through hole 701, so that the rear casing 12 has a protrusion 121 that is sandwiched between the head 611 and the tapered portion 613. More specifically, the protrusion 121 has a first surface 1211 facing the head 611 and a second surface 1212 facing the tapered portion 613. The first surface 1211 is in contact with the first stepped surface 614, and the second surface 1212 is in contact with the second stepped surface 615.

For example, the plug 60 is composed of an elastic material such as rubber, silicone or the like. In this way, the plug 60 may be elastically deformed under an action of an external force. In this way, since rubber, silicone and other materials are relatively soft, it is not easy to produce resonant sound and will not affect the acoustic characteristics of the closed loudspeaker box.

A size of the cylindrical portion 6132 of the plug 60 in the direction perpendicular to the central axis 60S (for example, the diameter of circle 6132 in FIG. 10B) may be smaller than or equal to a size (for example, diameter) of the second through hole 702 in the direction perpendicular to the central axis 70S. In this way, the cylindrical portion 6132 may be easily inserted into the through hole 70 and enter into the chamber 30 through the through hole 70.

The portion of the tapered portion 6131 close to the neck 612 has the first size, and the portion of the tapered portion 6131 close to the cylindrical portion 6132 has the second size. The first size is larger than the second size, that is, a structure of "smaller underneath and larger on an upper side" shown in FIG. 8 is formed. For example, the second size is smaller than or equal to the size (for example, diameter) of the second through hole 702 in the direction perpendicular to the central axis 70S, the first size is larger than the size (for example, the diameter) of the second through hole 702 in the direction perpendicular to the central axis 70S and is smaller than or equal to the size (for example, the diameter) of the first through hole 701 in the direction perpendicular to the central axis 70S. In this way, when the plug 60 is inserted into the through hole 70, the tapered portion 6131 is elastically deformed under a squeezing force of the rear casing 12. The structure of "smaller underneath and larger on an upper side" is beneficial for the tapered portion 6131 to sequentially pass through the first through hole 701 and the second through hole 702 to thereby entering the chamber 30. After entering the chamber 30, the tapered portion 6131 returns to its original shape, so that the plug 60 will not escape from the through hole 70.

The size of the neck 612 in the direction perpendicular to the central axis 60S may be equal to the size of the second through hole 702 in the direction perpendicular to the central axis 70S, so that the outer surface of the neck 612 is contact with the hole wall of the second through hole 702. Optionally, the size of the neck 612 in the direction perpendicular to the central axis 60S may also be slightly larger than the size of the second through hole 702 in the direction perpendicular to the central axis 70S, so that the neck 612 and the second through hole 702 form a tight fit (i.e, an interference fit). It should be understood that "slightly larger than" here means that a difference between the size of the neck 612 in the direction perpendicular to the central axis 60S and the size of the second through hole 702 in the direction perpendicular to the central axis 70S is within a tolerance range of the two.

The size of the head 611 in the direction perpendicular to the central axis 60S may be equal to the size of the first through hole 701 in the direction perpendicular to the central axis 70S, so that the outer surface of the head 611 is contact with the hole wall of the first through hole 701. Optionally, the size of the head 611 in the direction perpendicular to the central axis 60S may also be slightly larger than the size of the first through hole 701 in the direction perpendicular to the central axis 70S, so that the head 611 and the first through hole 701 form a tight fit (i.e, an interference fit). It should be understood that "slightly larger than" here means that a difference between the size of the head 611 in the direction perpendicular to the central axis 60S and the size of the first through hole 701 in the direction perpendicular to the central axis 70S is within a tolerance range of the two.

In this embodiment, through such a design, it may be ensured that the plug 60 is snapped into the through hole 70, and the plug 60 is prevented from escaping from the through hole 70.

The vent hole 62 penetrates the plug main body 61, that is, the vent hole 62 penetrates the head 611, the neck 612, the tapered portion 6131 and the cylindrical portion 6132 along the central axis 60S. When the plug 60 is inserted into the through hole 70, the vent hole 62 communicates the chamber 30 and the space outside the housing 10. In this way, the vent hole 62 may serve to communicate the space inside and outside the housing, so that an air pressure inside and outside the housing may be balanced, and the closed loudspeaker box may be adapted to different environments (for example, low air pressure environment, high air pressure environment). Moreover, when the closed loudspeaker box is operating, the heat accumulated inside the housing may also be discharged through the vent hole, which is beneficial to improve the acoustic characteristics of the closed loudspeaker box and prolong the service life of the closed loudspeaker box.

For example, a size of the vent hole 62 in the direction perpendicular to the central axis 60S (for example, the diameter of the circle 62 in FIG. 10B) is smaller than the size of any one of the first through hole 701 and the second through hole 702 in the direction perpendicular to the central axis 70S. For another example, the size of the vent hole 62 in the direction perpendicular to the central axis 60S (for example, the diameter of the circle 62 in FIG. 10B) is much smaller than the size of any one of the first through hole 701 and the second through hole 702 in the direction perpendicular to the central axis 70S. "Much smaller than" here may be understood as the size of the vent hole 62 in the direction perpendicular to the central axis 60S and the size of any one of the first through hole 701 and the second through hole 702 in the direction perpendicular to the central axis 70S are not on the same order of magnitude. For example, the size of the vent hole 62 in the direction perpendicular to the central axis 60S may be 1 μm, that is, on the order of micrometers. At this time, the size of any one of the first through hole 701 and the second through hole 702 in the direction perpendicular to the central axis 70S may be 1 mm, that is, on the order of millimeters; for another example, the size of the vent hole 62 in the direction perpendicular to the central axis 60S may be 1 mm, that is, on the order of millimeters. At this time, the size of any one of the first through hole 701 and the second through hole 702 in the direction perpendicular to the central axis 70S may be 1 cm, or even 1 m, that is, on the order of centimeters or meters. In other words, the size of the vent hole 62 in the direction perpendicular to the central axis 60S (for example, the diameter of the circle 62 in FIG. 10B) may be smaller than or equal to $\frac{1}{10}$ of the size of any one of the first through hole 701 and the second through hole 702 in the direction perpendicular to the center axis 70S.

Through such a design, the air tightness test may be performed when the plug 60 is not inserted into the through hole 70. Because the through hole 70 has a large aperture, the air may quickly enter the chamber 30, so that the air tightness test may be quickly completed; after the plug 60 is inserted into the through hole 70, only the vent hole 62 with a small aperture communicates the space inside and outside the chamber. Because the vent hole 62 has a small aperture, the vent hole 62 avoid abnormal sound generated by airflow while achieving a balanced air pressure and a heat discharging, so as not to affect the acoustic characteristics of the closed loudspeaker box. In this way, it is beneficial to improve the acoustic characteristics of the closed loudspeaker box and increase the service life of the closed loudspeaker box. In addition, if a small-aperture vent hole is formed directly on the housing without a plug, then a mold structure for manufacturing the housing needs to be changed. Moreover, the housing is generally made of hard plastic, wood and other materials, a small-aperture vent hole formed on the housing will increase the difficulty of manufacturing. In comparison, in the embodiments of the present disclosure, since the plug is made of elastic materials such as rubber, silicone, etc., it is possible to use injection molding, molding, and other integral molding methods to form a small-aperture vent hole in the plug, which is conducive to the manufacture of small aperture vent hole.

For example, the size of the vent hole 62 in the direction perpendicular to the central axis 60S (for example, the diameter of the circle 62 in FIG. 10B) may be related to a volume of the chamber 30. For example, the size of the vent hole 62 in the direction perpendicular to the central axis 60S (for example, the diameter of the circle 62 in FIG. 10B) may be increased as the volume of the chamber 30 increases. When the volume of the chamber 30 is large, the size of the vent hole 62 in the direction perpendicular to the central axis 60S may be designed to be larger; when the volume of the chamber 30 is small, the size of the vent hole 62 in the direction perpendicular to the central axis 60S may be designed to be smaller.

Further, a size (ie, length) of the vent hole 62 along the central axis 60S is related to the size of the vent hole 62 in the direction perpendicular to the central axis 60S (for example, the diameter of the circle 62 in FIG. 10B). Optionally, the size (i.e, length) of the vent hole 62 along the central axis 60S and the size of the vent hole 62 in the direction perpendicular to the central axis 60S (for example, the diameter of the circle 62 in FIG. 10B) may be designed so that a flow rate of the airflow passing through the vent hole 62 meets a requirement of a design value. For example, the flow rate of the airflow is smaller than a predetermined flow rate threshold. For example, the size (ie, length) of the vent hole 62 along the central axis 60S may become smaller as the size of the vent hole 62 in the direction perpendicular to the central axis 60S (for example, the diameter of the circle 62 in FIG. 10B) becomes smaller. When the size of the vent hole 62 in the direction perpendicular to the central axis 60S is small, the vent hole 62 may be designed to be shorter; when the size of the vent hole 62 in the direction perpendicular to the central axis 60S is larger, the vent hole 62 may be design to be longer. In this way, the flow rate of the airflow through the vent hole 62 may meet the requirement of the design value, that is, the flow rate of the airflow passing through the vent hole 62 will not be too fast, thereby avoiding abnormal sound.

Optionally, a size of the neck 612 in the direction along the central axis 60S is substantially equal to a size of the second through hole 702 in the direction along the central axis 70S, and a size of the head 611 in the direction along the central axis 60S is substantially equal to a size of the first through hole 701 in the direction along the central axis 70S. In this way, the head and neck of the plug 60 may be contained in the first through hole and the second through hole, respectively.

In the embodiments of the present disclosure, the number of the plug 60 may be one, and correspondingly, the number of the through hole 70 may also be one. Since structures of the plug and the through hole both affect the sound characteristics of the closed loudspeaker box, only one plug and one through hole are provided, which is beneficial to design the structure of the plug and the through hole, so as not to affect design characteristics of the closed loudspeaker box as much as possible.

It should be noted that in the illustrated embodiments, the vent hole is shown as a straight hole, and correspondingly, the central axis of the vent hole is shown as a straight line. However, the embodiments of the present disclosure are not limited thereto, and in other embodiments, the vent hole may be in a form of a curved hole or a bent hole, and the center axis of the vent hole is a curve or a broken line correspondingly.

It should be noted that in the above embodiments, the orthographic projections of the through hole, the vent hole and the plug main body in the direction perpendicular to the central axis being circular is taken as an example, the technical concept of the present disclosure has been described in detail. However, the embodiments of the present disclosure are not limited thereto. In other embodiments, the orthographic projections of the through hole, the vent hole and the plug main body in the direction perpendicular to the central axis may be other shapes, such as rectangle, square, hexagon, etc.

Figure 11:
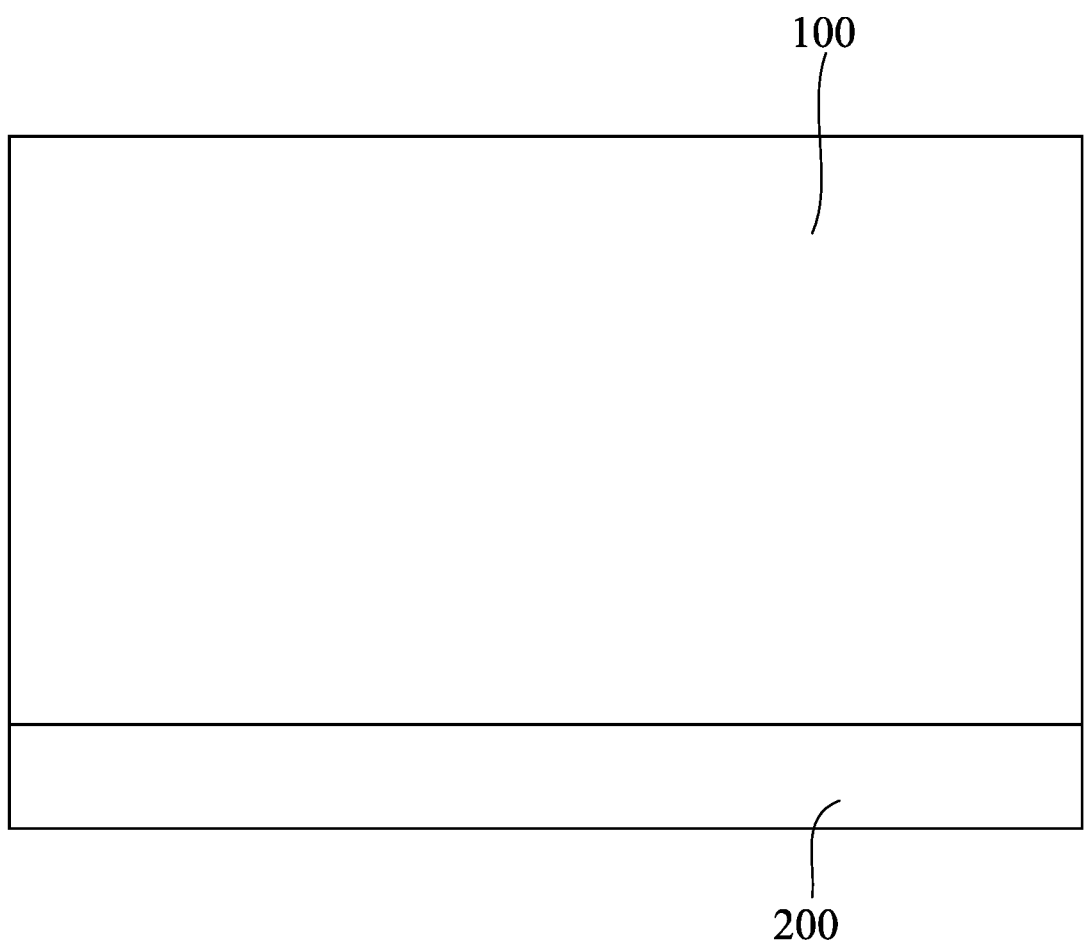
FIG. 11 is a schematic diagram of a display device including the closed loudspeaker box according to the embodiments of the present disclosure.

The embodiments of the present disclosure further provide a display device. As shown in FIG. 11, the display device includes a display panel 100 and a closed loudspeaker box 200 provided in the foregoing embodiments. For example, the display device may be a display device such as a television. Of course, the embodiments of the present disclosure are not limited thereto. For example, the display device may be any product or component with a display function, such as a smart phone, a tablet computer, a display, a car display, and the like.

Figure 12:
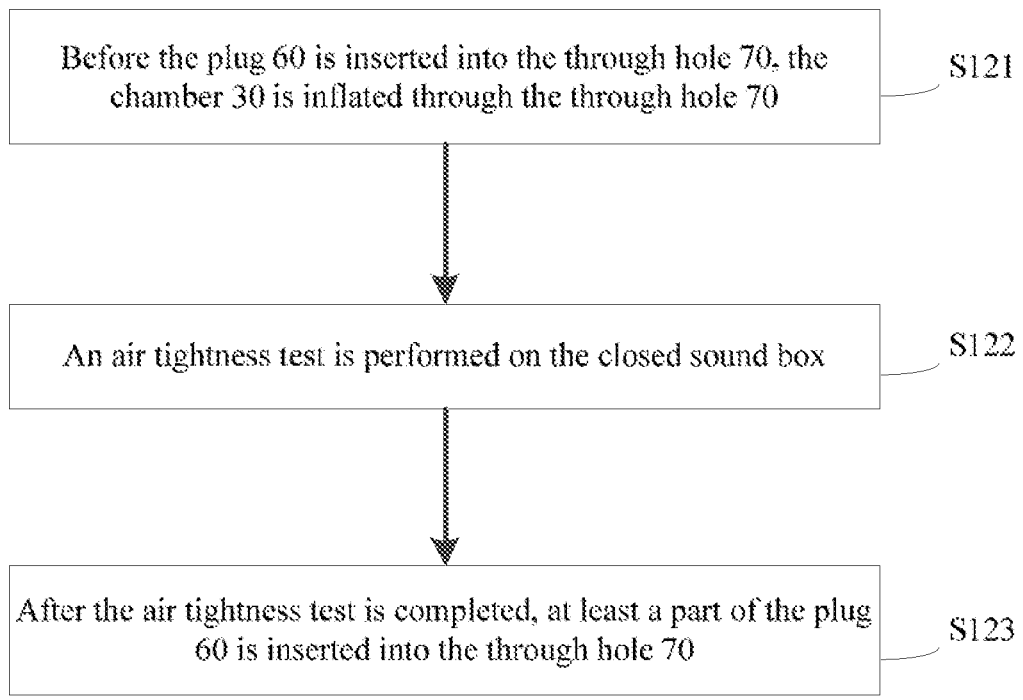
FIG. 12 is a flowchart of a method for testing the closed loudspeaker box according to the embodiments of the present disclosure.

The embodiments of the present disclosure also provide a method for testing the enclosed loudspeaker box provided by the embodiments of the present disclosure. As shown in FIG. 12, the testing method may include steps S121 to S123.

In step S121, before the plug 60 is inserted into the through hole 70, the chamber 30 is inflated through the through hole 70. In this way, since the through hole 70 has a large diameter, an inflation step may be completed quickly.

In step S122, an air tightness test is performed on the closed loudspeaker box. For example, the air tightness test may include: blocking the through hole 70; then using an instrument to detect or observe whether there is air leakage in the inflated chamber 30.

In step S123, after the air tightness test is completed, at least a part of the plug 60 is inserted into the through hole 70.

Therefore, in the embodiments of the present disclosure, the chamber 30 may be inflated when the plug 60 is not inserted into the through hole 70. Because the through hole 70 has a large aperture, the air may be quickly filled into the chamber 30, so that the air tightness test may be quickly completed.

In the embodiments of the present disclosure, by designing the structure of the closed loudspeaker box, the air pressure inside and outside the housing of the closed loudspeaker box may be balanced, and the heat accumulated inside the housing may be discharged in time, thereby improving product qualities of the closed loudspeaker box and the display device including the closed loudspeaker box.

Although some embodiments of the general technical concept of the present disclosure have been shown and described, those skilled in the art should understand that changes may be made to these embodiments without departing from principles and spirits of the general technical concept of the present disclosure, the scope of the present disclosure is defined by the claims and their equivalents.

What is claimed is:

1. A closed loudspeaker box, comprising:
   a housing;
   a chamber, wherein the chamber is surrounded by the housing;
   a through hole, wherein the through hole penetrates the housing and communicates with the chamber; and
   a plug, wherein at least a part of the plug is inserted into the through hole,
   wherein the plug comprises a plug main body and a vent hole penetrating the plug main body, and the vent hole communicates the chamber and a space outside the housing;
   wherein the plug main body comprises a head, a neck, and a tail, the neck is located between the head and the tail in a direction along the central axis, and a size of the neck in the direction perpendicular to the central axis is smaller than a size of the head in the direction perpendicular to the central axis;
   wherein the tail comprises a tapered portion and a cylindrical portion, the tapered portion is closer to the neck than the cylindrical portion, and a size of the tapered portion in the direction perpendicular to the central axis gradually decreases from the neck toward the cylindrical portion; and
   wherein the vent hole penetrates the head, the neck and the tail in the direction along the central axis.

2. The closed loudspeaker box according to claim 1, wherein the plug includes a central axis extending along a length direction of the plug main body, and a size of the vent hole in a direction perpendicular to the central axis is smaller than a size of the through hole in the direction perpendicular to the central axis.

3. The closed loudspeaker box according to claim 2, wherein the size of the vent hole in the direction perpendicular to the central axis is less than or equal to $1/10$ of the size of the through hole in the direction perpendicular to the central axis.

4. The closed loudspeaker box according to claim 2, wherein the size of the vent hole in the direction perpendicular to the central axis is related to a volume of the chamber.

5. The closed loudspeaker box according to claim 4, wherein a size of the vent hole in a direction along the central axis is related to the size of the vent hole in the direction perpendicular to the central axis.

6. The closed loudspeaker box according to claim 1, wherein a portion of the tapered portion close to the neck has a first size in the direction perpendicular to the central axis, and the size of the neck in the direction perpendicular to the central axis is smaller than the first size of the tapered portion.

7. The closed loudspeaker box according to claim 6, wherein the through hole comprises a first through hole and a second through hole, and a size of the first through hole in the direction perpendicular to the central axis is larger than a size of the second through hole in the direction perpendicular to the central axis.

8. The closed loudspeaker box according to claim 7, wherein a hole wall of the first through hole is in contact with an outer surface of the head, and a hole wall of the second through hole is in contact with an outer surface of the neck.

9. The closed loudspeaker box according to claim 8, wherein the head of the plug comprises a first stepped surface facing the neck, the housing comprises a protruding portion, the protruding portion comprises a first surface facing the head, and the first stepped surface is in contact with the first surface.

10. The closed loudspeaker box according to claim 9, wherein the tapered portion of the plug comprises a second stepped surface facing the neck, the protruding portion comprises a second surface facing the tail, and the second stepped surface is in contact with the second surface.

11. The closed loudspeaker box according to claim 1, wherein the plug main body is composed of an elastic material.

12. The closed loudspeaker box according to claim 1, wherein the tail is located in the chamber.

13. The closed loudspeaker box according to claim 7, wherein a size of the neck in a direction along the central axis is equal to a size of the second through hole in the direction along the central axis, and a size of the head in the direction along the central axis is equal to a size of the first through hole in the direction along the central axis.

14. The closed loudspeaker box according to claim 2, wherein an orthographic projection of any one of the through hole, the plug main body, and the vent hole in the direction perpendicular to the central axis is circular.

15. The closed loudspeaker box according to claim 1, wherein the closed loudspeaker box comprises only one plug and one through hole.

16. A display device, comprising the enclosed loudspeaker box according to claim 1.

17. A method for testing the closed loudspeaker box according to claim 1, comprising:
    inflating the chamber through the through hole before the plug is inserted into the through hole;
    performing an air tightness test on the closed loudspeaker box; and
    inserting at least a part of the plug into the through hole after the air tightness test is completed.

* * * * *